D. D. STELLE.
Grain Drill.
No. 66,904.
Patented July 16, 1867.
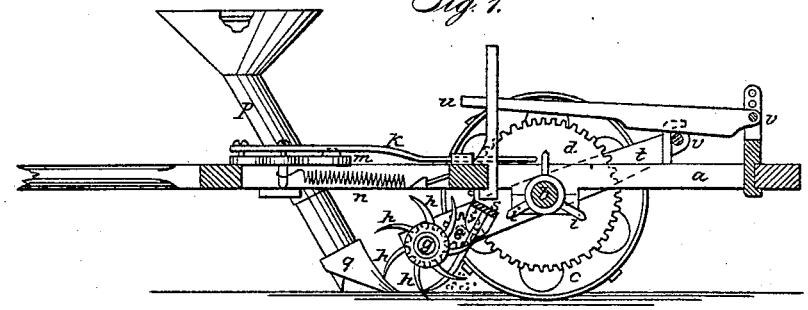
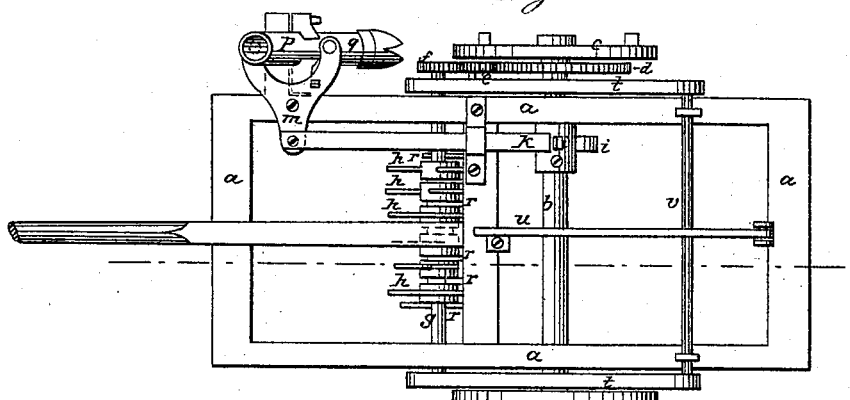
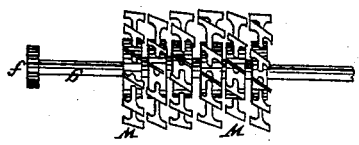
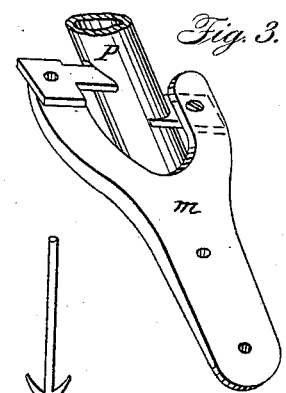
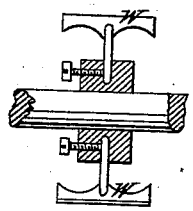
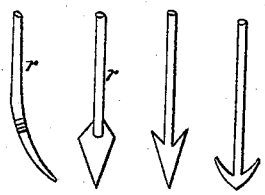
Witnesses:
Theo. Fusche
Wm Trervin
Inventor:
David D. Stelle
Per Munn & Co.
Attorneys.

United States Patent Office.

DAVID D. STELLE, OF NEW BRUNSWICK, NEW JERSEY, ASSIGNOR TO HIMSELF AND THOMAS E. McDONALD, OF SAME PLACE.

*Letters Patent No. 66,904, dated July 16, 1867.*

IMPROVEMENT IN COMBINED PLANTER, HARROW, AND CULTIVATOR.

*The Schedule referred to in these Letters Patent and making part of the same.*

TO ALL WHOM IT MAY CONCERN:

Be it known that I, DAVID D. STELLE, of New Brunswick, Middlesex county, New Jersey, have invented a new and improved Combined Corn-Planter, Harrow, and Cultivator; and I do hereby declare that the following is a full, clear, and exact description thereof, which will enable others skilled in the art to make and use the same, reference being had to the accompanying drawings, forming part of this specification.

The object of this invention is to combine in one a corn-planter, a harrow, and a cultivator. The corn-planter is so arranged that it will drop its corn in any desired quantity or distance, being regulated by a cam on the axle.

Figure 1 represents a sectional side elevation of my invention, as used as corn-planter and harrow, through the line $x\ x$.

Figure 2 represents a plan of the same.

Figure 3 is a detached view of the corn-dropper.

Figure 4 represents the different shapes for the teeth of the harrows.

Figure 5 represents a front view of the cultivator; and

Figure 6 is a section of the same showing mode of fastening the hoes to the hub.

Similar letters of reference indicate corresponding parts.

This machine consists in having a suitable frame, $a$, which rests on the axle $b$, between the wheels $c\ c'$. On the inner side of the wheel $c$ the cog-wheel $d$ is bolted and is keyed to the axle $b$. This cog-wheel $d$ meshes into the small wheel $e$, which meshes into the small cog-wheel $f$, which wheel is keyed to the shaft $g$, and thus as the machine is drawn forward it will cause the shaft on which the harrows $h$ are set to revolve with them, they being keyed or set square on the shaft. $i$ is a cam which is fixed on the axle $b$ for the purpose of striking the slide $k$, which is pivoted to one arm of the cut-off $m$. The cut-off $m$ is pivoted to the harrow-frame $a$, and as the machine is moved forward, the cam revolving with the axle will cause a backward and forward motion to the cut-off $m$. The back motion is caused by a spiral or other spring, $n$, one end of which is attached to the arm of the cut-off $m$, and the other fastened to the harrow-frame $a$. The corn-dropper is arranged so as to drop its grain so that the wheel may pass over it and pack the earth on top. The corn-dropper $p$ consists of a tube firmly fixed to the frame $a$, and is provided with two or more slots cut on opposite sides so as to allow the cut-offs to run in and out freely. The amount of grain to be dropped will thus be regulated by increasing or decreasing the space between the two cut-offs. The bottom of the corn-dropper $p$ is to drag sufficiently to make a small furrow into which the seed will fall. $q$ is an adjustable plough, which fits over the tube $p$, and serves to bank up the earth over the seed, and is then run over by the wheel which will pack the earth on top of the seed. The stationary harrow-teeth $r$ are set in a cross-bar of iron, $s$, which is secured at both ends by being bolted to the adjustable frame $t$, which turns on the axle $b$. The revolving harrow, (or hoes hereinafter mentioned,) run through and are held in the adjustable frame $t$, and can be raised or lowered at pleasure by means of the lever $u$, which is pivoted in an upright on the back of the frame $a$, and making the rod $v$ its fulcrum. The harrow-teeth in the revolving harrow are set in hubs or collars, and secured in them by means of set-screws or other suitable manner. These hubs or collars can be slipped on or off, as may be deemed necessary by the operator, so as to enable him to straddle a row of corn, and cultivate the land between when used in this manner. Two wheels of sheet metal are slipped on the shaft $g$, one on each side of the row of corn to be straddled, in order to protect the tender plants from being broken down by the clods of earth, which at times would be tossed on them. A series of hoes, $r$, is arranged in hubs or collars in a similar manner, and this machine can thus be changed from a harrow to a cultivator in a few minutes' time. The revolving harrow-teeth as well as the hoes are set so as to cut in a spiral form. The revolving harrow-teeth cut in between the teeth of the stationary harrow, and thus crush and cut the clods of earth, leaving the whole face of the ground where the machine may pass free from clods or lumps, and should a stone be caught it will pass between the harrow-teeth, as they will have sufficient spring for that purpose. $y$ represents a small rod, with a weight on its top. Said rod is free to swing on a rod which runs across the hopper, and its lower end is intended by its trembling motion to keep the throat of the hopper from clogging up. I do not limit myself to any particular number of teeth in the harrow or hoes.

Having thus described my invention, what I claim as new, and desire to secure by Letters Patent, is—

1. I claim the corn-dropper, and mode of cutting off the required amount of grain to be dropped, substantially as described.

2. I claim the revolving harrow made and operating in combination with the stationary harrow, in the manner and for the purpose substantially as described.

3. I also claim the revolving holes set in similar manner, to be used in place of the harrow, when required as a cultivator.

The above specification of my invention signed by me this 6th day of May, 1867.

DAVID D. STELLE.

Witnesses:
WM. F. MCNAMARA,
ALEX. F. ROBERTS.